United States Patent [19]

Lew et al.

[11] Patent Number: 5,309,771
[45] Date of Patent: May 10, 1994

[54] METHOD FOR PROCESSING SIGNALS IN VORTEX FLOWMETERS

[76] Inventors: Yon S. Lew; Hyok S. Lew, both of 7890 Oak St., Arvada, Colo. 80005

[21] Appl. No.: 848,291

[22] Filed: Mar. 9, 1992

[51] Int. Cl.$^5$ .............................................. G01F 1/32
[52] U.S. Cl. ................................. 73/861.22; 328/167
[58] Field of Search ...................... 73/861.22, 861.24; 307/520, 522, 524, 154; 338/162, 165, 167

[56] References Cited

U.S. PATENT DOCUMENTS

| | | | |
|---|---|---|---|
| 3,522,449 | 8/1970 | McMurtrie | 328/154 |
| 3,747,025 | 7/1973 | Iten et al. | 328/167 |
| 4,270,391 | 6/1981 | Herzl | 73/861.22 |
| 4,319,207 | 3/1982 | Gignoux | 328/167 |
| 4,545,258 | 10/1985 | Coursolle | 73/861.22 |
| 4,966,040 | 10/1990 | Ohmae | 73/861.22 |

Primary Examiner—Herbert Goldstein

[57] ABSTRACT

An electrical signal generated by a transducer included in a vortex sensor and conditioned by a preamplifier is supplied to a pair of parallel electronic filters respectively inhibiting transmission of the electrical signals with frequencies in a low and high ranges devided by a reference frequency, wherein a frequency detector detects the dominant frequency of the electrical signal and puts out control inputs depending on the dominant frequency of the electrical signal to two switches respectively controlling transmission of the electrical signal through the pair of parallel electronic filters; wherein the control input closes only one of the two switches depending on values of the dominant frequency of the electrical signal relative to the reference frequency in such a way that the electrical signal with frequencies in the low range is transmitted without the transmission of the high frequency noise and the electrical signal with frequencies in the high range is transmitted without the transmission of the low frequency noise.

6 Claims, 2 Drawing Sheets

METHOD FOR PROCESSING SIGNALS IN VORTEX FLOWMETERS

FIELD OF INVENTION

The present invention relates to a method for refining electrical signal generated by a transducer detecting vortex shedding from a bluff body included in a vortex shedding flowmeter.

BACKGROUND OF INVENTION

One of the two inventors of the present invention has invented a vortex flowmeter technology that is capable of measuring vortex shedding frequencies in air flows under the standard condition as low as one meter per second and in water flows as low as five hundredths of a meter per second. Unfortunately, in many applications of the flow measurements by using the vortex flowmeters, the working environments are subjected to various types of acoustic and mechanical vibrations, which create noise overshadowing the weak vortex signals generated by fluid flows at low velocities and, consequently, limit the minimum fluid velocities measurable with a vortex flowmeter. The present invention teaches a method for enhancing the vortex detecting capability of a vortex sensor included in the vortex flowmeter that operates under noisy ambient conditions by using a plurality of parallel electronic filters operating in a multiplexing mode controlled by switching based on the frequency of the vortex generated electrical signal.

SUMMARY OF INVENTION

The primary object of the present invention is to provide a method of operating an electronic circuitry comprising a plurality of electronic filters disposed in a parallel arrangement, wherein switching controlled by an input provided by the vortex shedding frequency detector automatically switches on only one of the plurality of electronic filters, that is optimized to selectively transmit the vortex generated electrical signal in a frequency range characterized by the control input frequency supplied by the vortex frequency detector operating the switching.

Another object is to provide the method described in the primary object of the present invention, that includes a signal output cut-off switch disposed at the output side of the plurality of electronic filters, which stops the transmission of the vortex generated signal when the frequency of the signal is less than a preset minimum value.

A further object is to provide the method described in the primary object of the present invention, that includes a signal output cut-off switch disposed at the output side of the plurality of electronic filters, which stops the transmission of the vortex generated signal when the amplitude of the signal is less than a preset minimum value.

These and other objects of the present invention will become clear as the description thereof progresses.

DESCRIPTION OF FIGURES

The present invention may be described with a greater clarity and specificity by referring to the following figures.

DESCRIPTION OF ILLUSTRATED EMBODIMENTS

Figure 1:
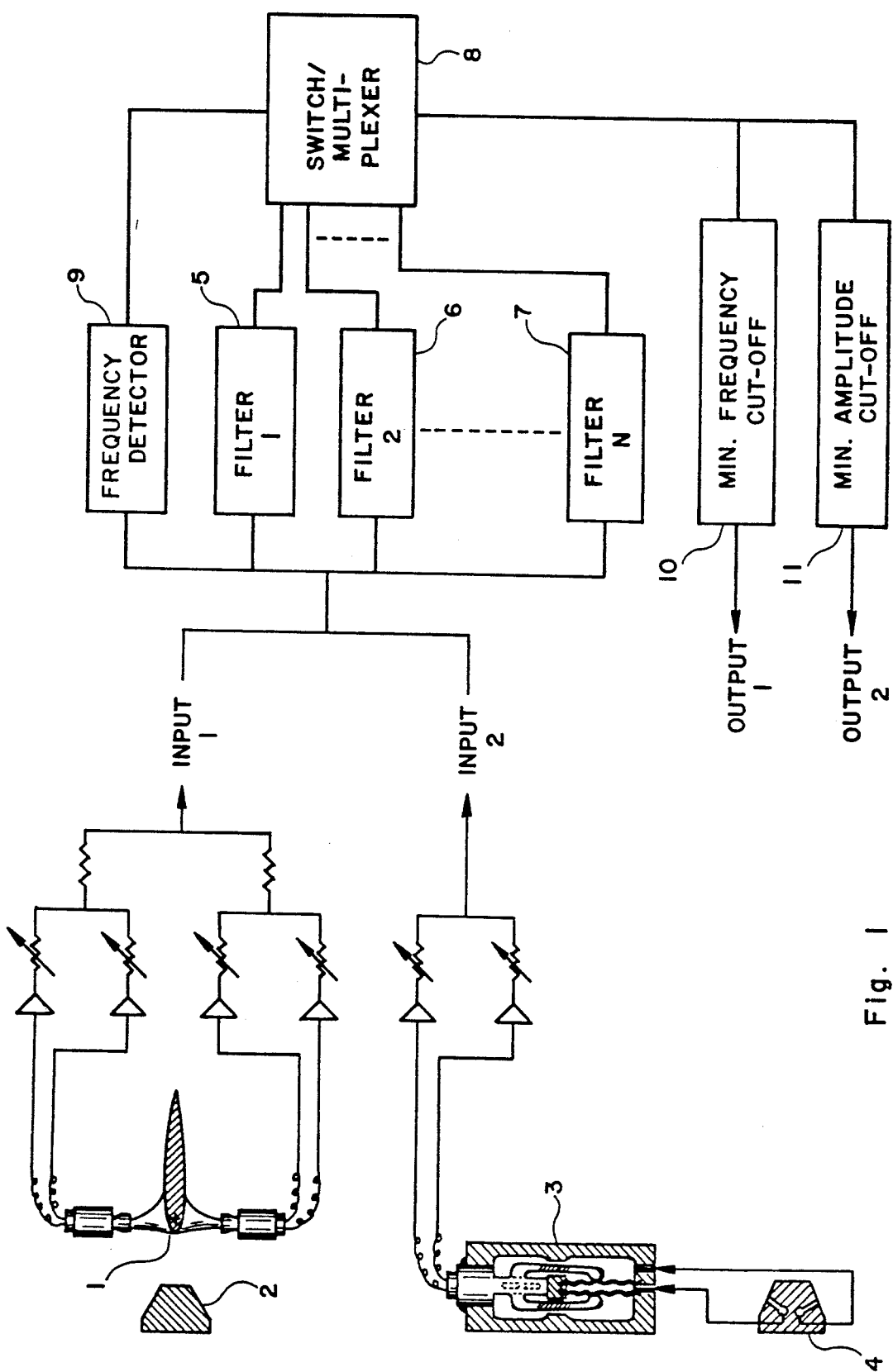
FIG. 1 illustrates a signal flow diagram illustrating the method of the present invention, that selectively transmits the vortex generated signal in a pure form and filters out the noise generated by the acoustic, electrical and mechanical vibrations occuring in the ambient surroundings.

A bluff body of an elongated cylindrical shape of a constant cross section transversely disposed in a fluid stream sheds a series of vortices from the two opposite sides thereof in an alternating pattern at a frequency linearly proportional to the fluid velocity in a wide range of the fluid velocity. The type of flowmeters known as the vortex shedding flowmeter or vortex flowmeter determines the fluid velocity by measuring the frequency of vortex shedding from the bluff body disposed across the flow passage in the flowmeter. A well designed version of the advanced-concept vortex detector employing a piezo-electric transducer assembly is capable of measuring vortex shedding frequencies in air flows under the standard condition as low as one meter per second and in water flows as low as five hundredths of a meter per second, while the vortex shedding phenomena actually take place in a clear and precise manner at fluid velocities much less than the aforementioned minimum velocities of the air and water flows. Under most circumstances, the vortex generated signal becomes overshadowed by the noise signal associated with the acoustic, electrical and mechanical vibrations existing in the ambient surroundings at fluid velocities less than three meters per second in air flows and fluid velocities less than one tenths of a meter per second in water flows. Typical acoustic and mechanical vibrations commonly existing in the flow measuring environments have a distribution peaking at 400 Hz and sharply decreasing at 200 and 600 Hz in intensity in most cases of flows involving gaseous media, and peaking at 20 Hz and rapidly decreasing in intensity at 10 and 30 Hz in liquid flows, while the most prevailing electrical noise occurs at 60 Hz. The noise mainly generated by these acoustic and mechanical vibrations seriously distorts the shape of the vortex generated signals in the low 10 percent of the range of flow measurement and creates beating and irregularly shaped signals in the upper 90 percent of the range, while the vortex generated signal in a pure form has a shape of nearly perfect sine wave. Of course, the vortex generated signals distorted by the noise result in errors in counting the vortex shedding frequency and, consequently, errors in the flow measurement.

A straight forward conventional wisdom suggests that the vortex generated signal in a pure form can be obtained by using a tracking filter with a narrow band width of about 10 Hz. While there is no doubt that an expensive high quality tracking filter does a wonderful job in rejecting the acoustic and mechanical vibration noise and provides the vortex generated signal in a pure form, there are two dilemmas in using the tracking filter. Firstly, a tracking filter doing the job is too expensive, as it may cost as much as a few thousand dollars while a complete package of a vortex flowmeter sells for less than two thousand dollars. Secondly, under very noisy operating conditions, the tracking filter has a tendency to lock on to noise signals instead of the vortex signal.

In FIG. 1 there is illustrated a signal flow diagram describing the method taught by the present invention, that provides a very inexpensive and highly reliable alternative to the expensive and sometimes erroneous tracking filter. The electrical signal generated by one or other type of vortex detecting transducer, such as [input 1] supplied by a planar vortex sensor 1 disposed downstream of the vortex generating bluff body 2, or [input 2] supplied by a differential pressure transducer 3 detecting the alternating differential fluid pressure across the two opposite sides of the bluff body 4, or inputs from other types of vortex sensors operating on the piezoelectric, capacitive, ultrasonic, or optical principles, and conditioned by a preamplifier is supplied to the input end of a plurality of electronic filters 5, 6, 7, etc. disposed in a parallel arrangement, which plurality of electronic filters are respectively connected to a bank of parallel switches included in the multiplexer unit 8. The switches in the multiplexer unit 8 are normally open and controlled by a frequency detector 9. The input signal generated by the vortex signal generator 1 and 2, or 3 and 4 is supplied to the filter bank comprising a plurality of individual filters 1,2, ---N assembled into a parallel relationship in the form of input 1 or input 2. At an upstream junction prior to the filter bank the input 1 or input 2 signal generated by a vortex generator and conditioned by a preamplifier, is branched off from the line supplying the input 1 or input 2 to the input end of the filter bank, and supplied to the frequency detector 9 that supplies a commanding signal to the switch/multiplexer 8, wherein the commanding signal is generated as a function of the dominant frequency of the input 1 or input 2 signal supplied to the input end of the filter bank. Each of the switches included in the multiplexer unit 8 is assigned with each of a plurality of threshold frequencies, wherein the nth individual swutch closes when the frequency detected by the frequency detector 9 is equal to or greater than the (n−1)th threshold frequency and less than the nth threshold frequency, whereby only one switch stays closed at any instance. For example, when there are three filters F1, F2 and F3 respectively connected three switches with the assigned threshold frequencies S1;200, S2;500 and S3;5000, only the switch S1 closes when the frequency detected by the frequency detector 9 is less than 200 Hz; only the switch S2 closes when the frequency detected by the frequency detector 9 is equal to or greater than 200 Hz and less than 500 Hz; and only the switch S3 closes when the frequency detected by the frequency detector 9 is equal to or greater than 500 Hz and less than 5000 Hz. In most case of applications, it is usually good enough to include only two parallel electronic filters. For example, a vortex flowmeter measuring gas gas flows in the range of vortex shedding frequencies 100 to 3000 Hz, may include a combination of two parallel electronic filters including a low pass filter with a cut-off frequency of 200 Hz and a band pass filter with cut-off frequencies of 200 and 1500 Hz, wherein the switch on the low pass filter closes when the frequency detected by the frequency detector 9 is less than, for example, 250 Hz, and the switch on the band pass filter closes when the frequency detected by the frequency detector 9 is equal to or greater than 250 Hz. Of course, the combination of two parallel electronic filters may include a band pass filter with cut-off frequencies 100 and 200 Hz instead of the 200 Hz low pass filter, and a high pass filter with a cut-off frequency of 200 Hz instead of the 200–1500 Hz band pass filter.

The minimum value of the fluid velocity measurable with a given vortex flowmeter depends on the sensitivity of the vortex sensor, that is the inherent, capability of that vortex sensor to detect the weakest possible vortices shed from the bluff body under the absolutely noise-free condition, as well as on the level of acoustic and mechanical vibration noise existing in the flow measuring environment. For example, a vortex flowmeter capable of measuring vortex shedding frequencies in a range of 100 to 3000 Hz may register 60 Hz electrical noise when there is absolutely no flow going, or may register 120 Hz mechanical vibration noise when the actual vortex signal is of 110 Hz, and thus provides false information on the flow data. In order to eliminate such a source of errors arising from the acoustic, electrical and mechanical vibration noise, the output end of the combination of the plurality of electronic filters may include a minimum frequency cut-off switch 10 controlled by the frequency detector 9, that opens and cuts off the signal output when the frequency detected by the frequency detector 9 is less than a preset minimum value, for example, 100 Hz in order to eliminate the false reading caused by the noise that exists in the absence of the vortex signal or by the noise that overshadows the vortex signal at the low end of the measurable range of the vortex shedding. The minimum frequency cutting off the signal output should be easily resetable in the field, whereby the cut-off frequency can be adjusted to the actual level of the noise existing in the field. The minimum frequency cut-off switch 10 may be replaced with a minimum aplitude cut-off switch controlled by a signal amplitude detector that is not shown in the particular illustration for the brevity, which minimum amplitude cut-off switch cuts off the signal output when the amplitude of the signal falls below a preset minimum value adjustable in the field.

Figure 2:
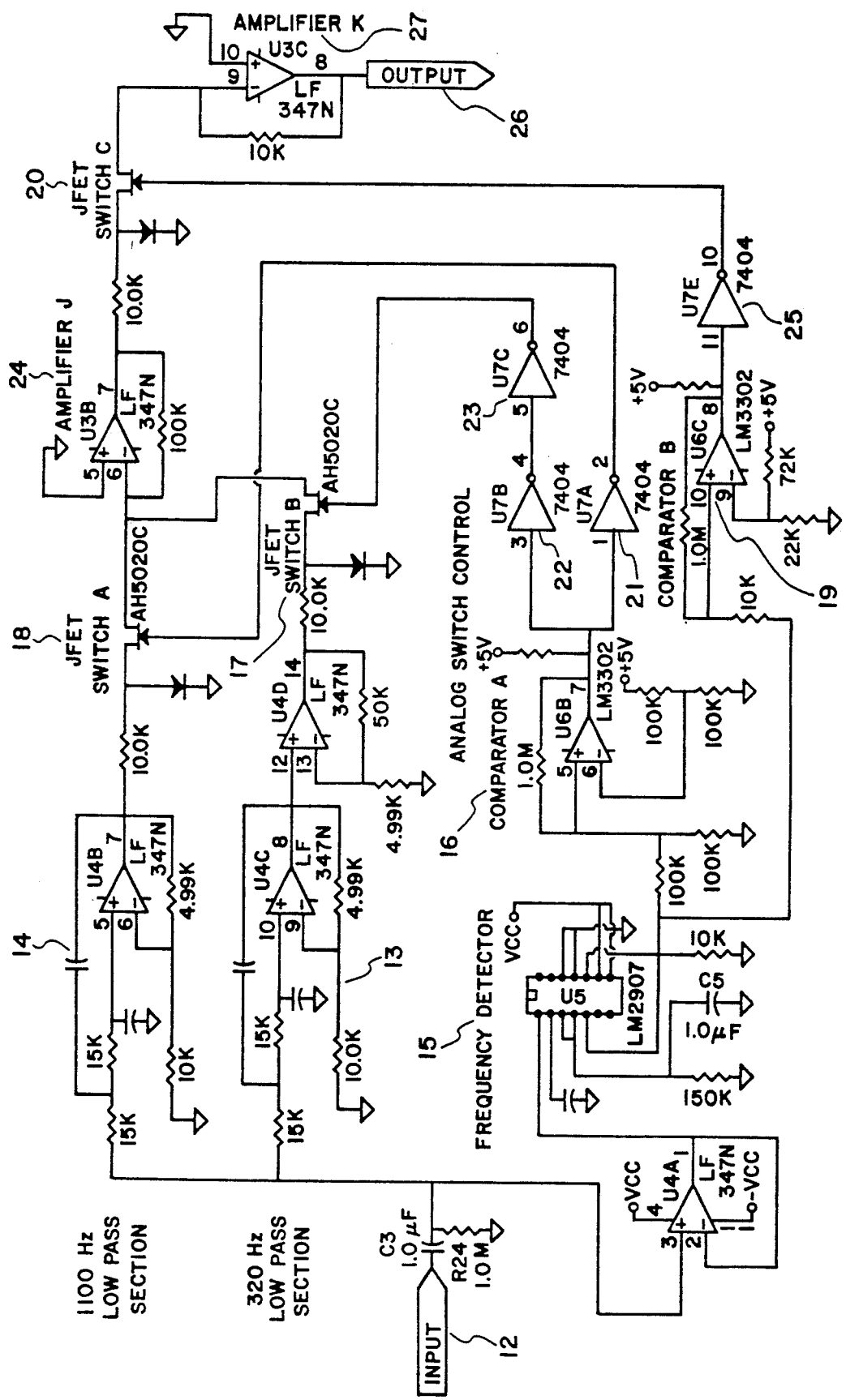
FIG. 2 illustrates an embodiment of an actual electronic circuitry that executes the method of the present invention illustrated in FIG. 1.

In FIG. 2 there is illustrated an embodiment of an electronic circuitry that actually executes the method for the signal processing shown in FIG. 1. This particular electronic circuitry comprises only a pair of parallel electronic filters. The input signal 12 generated by a vortex sensor and conditioned by a preamplifier is directed to the 320 Hz low pass filter section 13, the 1100 Hz low pass filter section 14 and a frequency detector section 15 in a parallel relationship. The comparator 16 puts out an analog switch control signal to close JFET switch 17 and open JFET switch 18 when the dominant frequency of the input signal detected by the frequency detector 15 is less than 300 Hz. When the dominant frequency of the input signal is greater than 300 Hz, the comparator 16 puts out an analog switch control signal that opens the JFET switch 17 and closes the JFET switch 18. The comparator 19 also puts out an analog switch control signal to the JFET switch 20 that opens when the dominant frequency of the input signal is less than 80 Hz and thus shutting off the signal output 26. Of course, the JFET switch 20 remains closed when the frequency of the input signal is greater than 80 Hz. The outputs of the two comparators 16 and 19 are directed to digital inverters 21, 22 and 23 in order to buffer the switch control signals and to perform simultaneous switching between the 320 Hz low pass filter section 13 and the 1100 Hz low pass filter section 14. The two buffered outputs of comparator 16 control the JFET switches 17 and 18. The control signal to the JFET switch 18 is inverted with respect to the control signal to the JFET switch 17 so that, when the JFET switch 17 is closed, the JFET switch 18 is open and vice versa.

Therefore, when the frequency detector 15 detects an input signal 12 with dominant frequency less than 300 Hz, only the output of 320 Hz low pass filter section 13 is coupled to the output JFET switch 20 through an intermediate buffer amplifier 24. When the frequency detector 15 detects an input signal 12 with dominant frequency greater than 300 Hz, only the output of 1100 Hz low pass filter section 14 is coupled to the output JFET switch 20 through the intermediate buffer amplifier 24. The output of the comparator 19 is also buffered and inverted by another digital inverter 25, and controls the output JFET switch 20. If the frequency of the input signal is less than 80 Hz, the output JFET switch 20 is opened and the input signal 12 produces no output signal 26. If the frequency of the input signal is greater than 80 Hz, then the output of either the JFET switch 17 or the JFET switch 18 is coupled to the output amplifier 27 and, consequently, the input signal 12 produces the output signal 26. The vortex flowmeter including the electronic circuitry shown in FIG. 2 measures vortex shedding frequencies in a range of 80 to 3000 Hz with little error as the output 25 therefrom provides substantially pure vortex signal of sine waves. The vortex signals with frequencies below 300 Hz, in which range the noise signals concentrated in a frequency range of 400 to 600 Hz seriously distort the vortex signal, is selectively transmitted by the 320 Hz low pass filter section 13 as the noise signals are filtered out thereby. The vortex signals with frequencies above 300 Hz have booming amplitude shooting over the noise signal and, consequently, only the very high frequency electronic noise is required to be filtered out by the 1100 Hz low pass filter section 14 in order to provide relatively clean vortex signals with frequencies above 300 Hz. Of course, when the vortex signals with frequencies above 300 Hz experiences beating due to the noise of low frequencies, the 1100 Hz low pass filter section 14 may be replaced by a 320–1100 Hz band pass filter section. The acoustic, electric and mechanical vibrations noise overshadowing the vortex signals in a noisy environment at frequencies below 80 Hz does not produce any false readings, because the output JFET switch 20 shuts off the output of the vortex flowmeter whenever the frequency of the output signal falls below 80 Hz.

While the principles of the present invention have now been made clear by the illustrative description of the method, there will be many modifications of hardwares as well as softwares in actually implementing the method, which are immediately obvious to those skilled in the art and particularly adapted to the specific working environments and operating conditions in the practice of the invention without departing from those principles. It is not desired to limit the invention to the particular illustrative embodiments shown and described and accordingly, all suitable modifications and equivalents may be regarded as falling into the scope of the invention as defined by the claims which follow.

We claim:

1. A method for processing a vortex generated electrical signal comprising in combination:
  a) supplying an input electrical signal generated by a transducer included in a vortex sensor and conditioned by a preamplifier to an input end of a plurality of electronic filters disposed in a parallel arrangement; wherein each of said plurality of electronic filters includes each of a plurality of normally open switches closing and opening depending on a control signal generated as a function of frequency band of an alternating electrical signal, said each of the plurality of electronic filters transmitting the input electrical signal through and to an output end of said each of plurality of electronic filters at a desired efficiency when said each of the plurality of switches is closed and cutting off transmission of the input electrical signal through said each of the plurality of electronic filters when said each of the plurality of switches is open;
  b) detecting a dominant frequency of the input electrical signal taken off prior to the input end of the plurality of electronic filters and before being transmitted through the plurality of electronic filters; and
  c) generating the control signal as a function of said dominant frequency of the input electrical signal taken off prior to the input end of the plurality of electronic filters and before being transmitted through the plurality of electronic filters, and supplying the control signal to the plurality of switches respectively controlling transmissions of the input electrical signal through the plurality of electronic filters; wherein the control signal closes only one of the plurality of normally open switches belonging to one of the plurality of electronic filters, said one of the plurality of electronic filters transmitting the input electrical signal at a desired efficiency within a frequency band characterized by said dominant frequency of the input electrical signal generating the control signal.

2. A method as defined in claim 1 wherein a frequency controlled output switch cuts off an output electrical signal put out from an output end of the plurality of electronic filters when frequency of the output electrical signal is less than a predetermined value.

3. A method as defined in claim 1 wherein an amplitude controlled output switch cuts off an output electrical signal put out from an output end of the plurality of electronic filters when amplitude of the output electrical signal is less than a predetermined value.

4. A method for processing a vortex generated electrical signal comprising in combination:
  a) supplying an input electrical signal generated by a transducer included in a vortex sensor and conditioned by a preamplifier to an input end of a pair of electronic filters disposed in a parallel arrangement; wherein each of said pair of electronic filters includes each of a pair of normally open switches closing and opening depending on a control signal generated as a function of frequency band of an alternating electrical signal, said each of the pair of electronic filters transmitting the input electrical signal through and to an output end of said each of the pair of electronic filters at a desired efficiency when said each of the pair of switches is closed and cutting off transmission of the input electrical signal through said each of the pair of electronic filters when said each of the pair of switches is open;
  b) detecting a dominant frequency of the input electrical signal taken off prior to the input end of the pair of electronic filters and before being transmitted through the pair of electronic filters; and
  c) generating the control signal as a function of said dominant frequency of the input electrical signal taken off prior to the input end of the pair of electronic filters and before being transmitted through the pair of electronic filters, and supplying the control signal to the pair of switches respectively controlling transmissions of the input electrical signal through the pair of electronic filters; wherein the control signal closes only one of the pair of normally open switches belonging to one of the pair of electronic filters, said one of the pair of electronic filters transmitting the input electrical signal at a desired efficiency within a frequency band characterized by said dominant frequency of the input electrical signal generating the control signal.

5. A method as defined in claim 4 wherein a frequency controlled output switch cuts off an output electrical signal put out from an output end of the pair of electronic filters when frequency of the output electrical signal is less than a predetermined value.

6. A method as defined in claim 4 wherein an amplitude controlled output switch cuts off an output electrical signal put out from an output end of the pair of electronic filters when amplitude of the output electrical signal is less than a predetermined value.

* * * * *